United States Patent
Checka et al.

(10) Patent No.: US 9,452,528 B1
(45) Date of Patent: Sep. 27, 2016

(54) CONTROLLER DEVICE AND METHOD

(75) Inventors: Neal Checka, Waltham, MA (US);
David Demirdjlan, Berkeley, CA (US);
Shawn Schaffert, Somerville, MA (US)

(73) Assignee: VECNA TECHNOLOGIES, INC., Cambridge, MA (US)

( * ) Notice: Subject to any disclaimer, the term of this patent is extended or adjusted under 35 U.S.C. 154(b) by 35 days.

(21) Appl. No.: 13/411,938

(22) Filed: Mar. 5, 2012

(51) Int. Cl.
*B25J 9/00* (2006.01)
*B25J 9/16* (2006.01)

(52) U.S. Cl.
CPC .......... *B25J 9/1612* (2013.01); *G08C 2201/93* (2013.01)

(58) Field of Classification Search
None
See application file for complete search history.

(56) References Cited

U.S. PATENT DOCUMENTS

| | | | |
|---|---|---|---|
| 7,348,747 B1 | 3/2008 | Theobald et al. | |
| 7,719,222 B2 | 5/2010 | Theobald | |
| 7,902,784 B1 | 3/2011 | Theobald | |
| 8,169,406 B2* | 5/2012 | Barney et al. | 345/158 |
| 2008/0086241 A1* | 4/2008 | Phillips et al. | 701/2 |
| 2012/0294696 A1* | 11/2012 | Summer et al. | 414/1 |

OTHER PUBLICATIONS

Chua, W. L. K., Chuan Huat Foo, and Yong Siang Lee. "Interactive methods of tele-operating a single unmanned ground vehicle on a small screen interface." Human-Robot Interaction (HRI), 2011 6th ACM/IEEE International Conference on. IEEE, 2011.*
Varcholik, Paul, Daniel Barber, and Denise Nicholson. "Interactions and Training with Unmanned Systems and the Nintendo Wiimote".*

* cited by examiner

*Primary Examiner* — Ryan Jarrett
(74) *Attorney, Agent, or Firm* — Albert J. Brunett

(57) ABSTRACT

A device and method is provided for controlling a mechanism in communication with a handheld device. The method includes sensing a maneuver of the handheld device and providing at least one vector command to the mechanism based on the sensed maneuver in order to control the mechanism.

9 Claims, 6 Drawing Sheets

Gesture control.

Speech control.

Manipulation control.

ISR Sharing.

Waypoint Navigation.

Person Following.

CONTROLLER DEVICE AND METHOD

BACKGROUND OF THE INVENTION

1. Technical Field

The present invention relates generally to controllers, and more particularly to a controller for remotely controlling a desired mechanism, such as a vehicle, a robotic and/or a manipulator system or the like.

2. Background Information

Development efforts for handheld controllers or Operator Control Units (OCUs) often yield inflexible "stove-pipe" solutions for particular applications thereby requiring a different OCU for each application. Additionally, handheld OCUs primarily are designed for better form factors leading to a mere repackaging of traditional interfaces and lag behind the critical, high-level functionality of larger non-handheld OCUs.

This is particularly true for unmanned ground vehicles (UGVs) or unmanned aerial vehicles (UAVs) that may be remotely controlled by a vehicle operator with an OCU. Existing OCUs, however, are typically non-handheld, bulky, heavy, unintuitive to operate by vehicle operators, difficult to upgrade, and utilize significant quantities of power among other drawbacks.

SUMMARY OF THE DISCLOSURE

A device and method is provided for controlling a mechanism in communication with a handheld device. The method includes sensing a maneuver of the handheld device and providing at least one vector command to the mechanism based on the sensed maneuver in order to control the mechanism.

BRIEF DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities shown in the drawings.

DETAILED DESCRIPTION OF THE INVENTION

Figure 1:
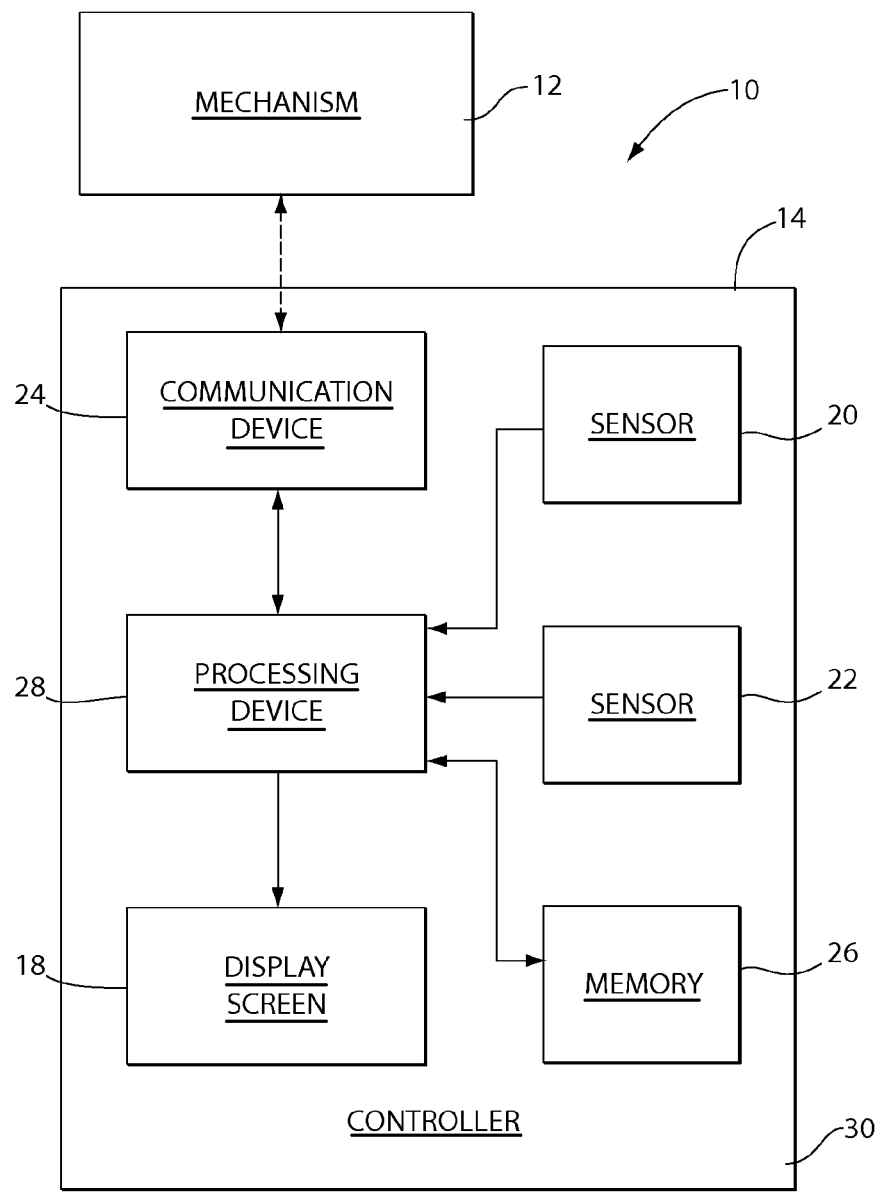
FIG. 1 is a block diagram illustrating one embodiment of a system of the present invention.

Embodiments of the present invention will be described below with reference to the accompanying drawings. It should be understood that the following description is intended to describe exemplary embodiments of the invention, and not to limit the invention.

It is understood that the present invention is not limited to the particular module components, analysis techniques, etc. described herein, as these may vary. It is also to be understood that the terminology used herein is used for the purpose of describing particular embodiments only, and is not intended to limit the scope of the present invention. It must be noted that as used herein, the singular forms "a," "an," and "the" include plural reference unless the context clearly dictates otherwise.

Unless defined otherwise, all technical and scientific terms used herein have the same meanings as commonly understood by one of ordinary skill in the art to which this invention belongs. Preferred methods, system components, and materials are described, although any methods and materials similar or equivalent to those described herein can be used in the practice or testing of the present invention.

The design and implementation of autonomous and semi-autonomous mechanisms such as, for example, vehicles, robots and manipulators is a growing technical area with promising benefits for a variety of industries. Examples of various robotic applications particularly those with hydraulic systems can be found, for example, in U.S. Pat. Nos. 7,902,784; 7,719,222 and 7,348,747, the disclosures of which are hereby incorporated by reference in their entirety. It is to be understood, however, that the particular details of the robot, vehicle, tool, actuator, hydraulic system or other apparatus can vary without departing from the teachings of the present invention. Many of the features of the present invention are illustrated in applicants' provisional patent application No. 61/606,933 which includes two U.S. Government grant proposals topic nos. D102-002-0075 (Vecna vDoc ID 793, pages 3-23) and D2-1109 (Vecna vDoc ID 793, pages 3-46 all of which are hereby incorporated by reference.

The term "mechanism" preferably is used herein to describe an electro-mechanical device and/or system. The electro-mechanical device and/or system may include one or more hydraulic, pneumatic, gear, belt, chain, linkage and/or electricity driven actuators and/or effectors, which may be electronically controlled by, for example, a processor, a switch, etc. Examples of an electro-mechanical device and/or system may include a vehicle or mobile robot, a manipulator, an object transport system, earth moving equipment etc. Examples of a manipulator may include an articulated industrial robot, a robotic arm, a single or multi-axis mill, a crane, a winch, a robotic welding device, a robotic coating device, a hoist, etc. An example of an object transport system is a belt, cable, rope and/or chain conveyor system. The present invention, however, is not limited to any particular electro-mechanical device and/or system configurations, whether known now or developed in the future.

Figure 2:
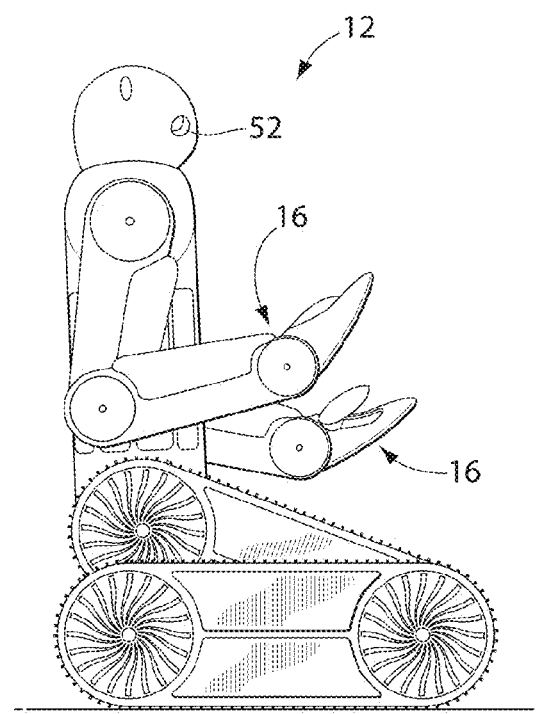
FIG. 2 is a side view of one embodiment of a mobile robotic vehicle with a plurality of arm members that may be utilized with a handheld controller of the present invention.

In the specific embodiment illustrated in FIG. 2, the mechanism 12 may be configured as a mobile robotic vehicle with one or more manipulators (e.g., arm members 16 or the like) such as those disclosed in the above-referenced U.S. Pat. Nos. 7,902,784; 7,719,222 and 7,348, 747. The robot can be any type of robot having any type of capability, power system or other feature.

In alternate embodiments, the mechanism 12 may be configured as any type of unmanned vehicle, such as, for example, an unmanned ground vehicle (UGV), an unmanned aerial vehicle (UAV), an unmanned underwater vehicle (UUV) or an unmanned surface vehicle (USV) designed for any number of applications including military applications, commercial (e.g., hospital) applications, and/or consumer applications. In some embodiments, for example, the mechanism 12 may be designed for assisting hospital patients, elderly, disabled and/or otherwise-incapacitated users with activities of daily living (ADL). Examples of activities of daily living may include getting out of bed, getting into and out of a bathtub, getting on and off a toilet, generally navigating around a living quarters, etc. Additionally, the mechanism 12 can be any high degree of freedom robot, such as applicants' BEAR (Battlefield Extraction Assist Robot), for example.

In other embodiments, the mechanism 12 may be designed for warehousing and/or product transportation. It is to be understood, however, that the system 10 and controller 14 can be used to control any type of mechanism 12 or object or for any purpose whatsoever.

Figure 3:
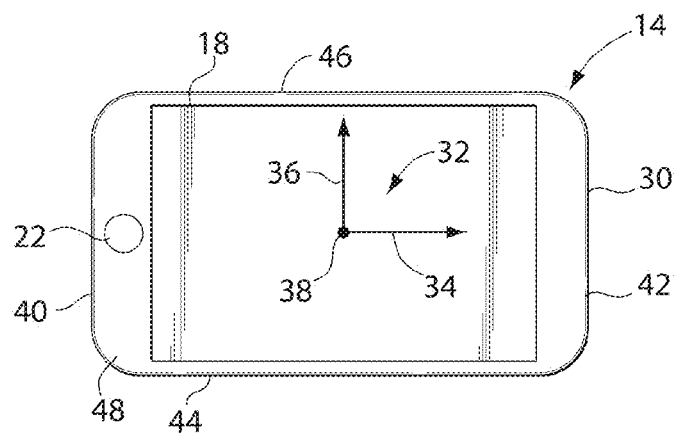
FIG. 3 is a front view illustrating one embodiment of a handheld controller of the present invention.
Figure 4:
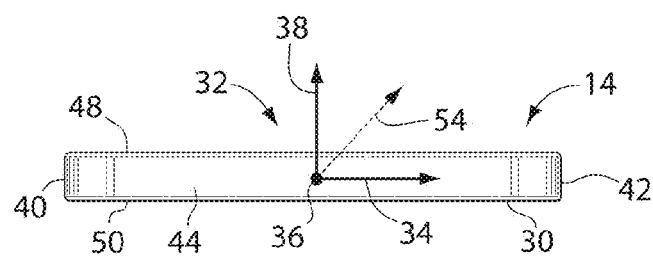
FIG. 4 is an edge view of the handheld controller illustrated in FIG. 3.

Referring to FIGS. 3 and 4, the controller 14 may be configured as a handheld device such as, for example, a laptop, tablet, personal digital assistant (PDA) and/or a cellular phone (e.g., smart phone) or any other type of mobile computing device. Such a handheld device may be self-contained, and sized and ergonomically configured for manipulation by one or both hands of an operator. The present invention, however, is not intended to be limited to these configurations and can take the form of any type of device so long as it functions as described herein. In some embodiments, for example, the controller 14 may be configured as a wearable device (e.g., a watch) that may be strapped or otherwise attached to an appendage (e.g., an arm, wrist, leg, etc.) of an operator, operator clothing and/or operator gear such as a backpack, a weapon, a radio, a flashlight, etc.

Referring to FIG. 1, the controller 14 typically includes a variety of electronics including a display screen 18 (e.g., an LCD screen, an LED screen, etc.), one or more sensors 20 and 22, a wireless communication device 24 (e.g., a transceiver), memory 26, and a processing device 28, which are housed within a handheld device housing 30. One or more cameras (not illustrated) may also be included with the controller 14 including 3D or infrared cameras or the like to provide depth sensing and gesture recognition as well as an audio sensor to provide speech recognition capabilities. The particular components that make up the controller 14, however, can vary and may include additional components and features other than those described herein.

Briefly, in operation, when used in conjunction with a mechanism 12 such as a mobile robot, for example, an operator may merely maneuver the controller 14 in a variety of ways to accomplish various desired motions of the robot. In the context of the present invention "maneuvering" can include, for example, any motion or combination of motions of the controller 14 including the speed or acceleration with which an operator or user may maneuver the controller 14, and can also include, for example, tilting of the controller 14 about an axis or merely moving the controller 14 such as in a plane without tilting the controller 14 or a variety of other gestures.

For example, if the operator desires to move the robot forward, the controller 14 can be designed so that merely a forward tilt of the controller 14 starts the robot moving forward. The degree of tilt of the controller 14 as well as the speed or acceleration at which the controller 14 is tilted forward can indicate some other command to the robot such as what speed the robot is to advance forward. Of course, any movement of the controller 14 can be identified with a particular movement, action, mode change, directive, power on/off, or pre-planned routine of the robot as desired.

When used in this capacity the controller 14 essentially functions like a handheld wireless steering wheel with some features similar to the "yoke" or "stick" on an airplane. If desired, the controller 14 can be designed so that the operator can rely on merely movement or maneuvering alone of the controller 14 to move the robot as desired with or without touch screen or button infrastructure.

This can be particularly beneficial since the operator does not need to move a finger, thumb or other digit or appendage to touch something on the controller 14 or another controller or other control object. This not only enables more easy and ready control of the robot, but can eliminate having the operator take his/her eye off the robot if in visual contact with the robot or a screen if the operator is controlling the robot from a remote location and using a video screen or the like to visualize the environment within which the robot is moving.

Additionally, when used in difficult environments the operator can readily use the controller 14 without having to take off a glove, for instance, or drop or set down other items the operator may be holding. Also, this design enables manipulating the controller 14 with one hand if needed or even with the controller 14 out of sight, such as behind the operator's back or in a pocket, for example. This provides a distinct advantage in many applications, particularly in military applications where the limitations of the battlefield, night time or covert operations or the like may inhibit using a finger or the like to control the robot or mechanism.

Although particular maneuvers of the controller 14 may be associated beforehand with particular movement(s) of the mechanism 12, it also is possible to teach the mechanism 12 to perform a particular task with a maneuver or gesture. For example, once a "teach" mode is activates moving the controller 14 in a circle can be used to teach the mechanism 12 to rotate 180 degrees or more. As can readily be understood, any number of tasks can be taught by maneuvering or gesturing with the controller 14 in any number of ways.

The controller may also be designed to control the mechanism based on one or more (e.g., hand or arm) gestures where, for example, the controller is strapped to an operator appendage. For example, the operator may move his/her arm back and forth to signal the mechanism to move forward. In another example, the operator may move his/her arm to the right to signal the mechanism to move to the right, etc. In this manner, predetermined (e.g., hand or arm) gestures, like those used by traffic officers or by various military or heavy equipment operators may be used to control mechanism operation.

Another unique feature of the present invention is its ability to provide commands based merely on the speech of the operator. More particularly, the present invention may include "on-board" or "off-board" speech recognition capabilities to enable an operator to merely speak a variety of commands for the mechanism 12 to implement. An "on-board" feature is important in network deprived environments as commonly found in military applications and avoids having the loss of the mechanism 12 due to a network outage or interference. It also provides an additional level of security between the controller 14 and the mechanism 12 since no network communication is required that may be susceptible to hacking.

Referring again to FIG. 1, the sensors 20 and 22 can be any type of sensor including but not limited to an inertial sensor 20 and a user input sensor 22. The inertial sensor 20 may include, for example, one or more accelerometers and/or a gyroscope, compass or any other type of sensor including infrared, laser, camera or the like.

The user input sensor 22 may include, for example, an electro-mechanical button and/or a touch screen sensor or sensor array configured with the display screen 18. The user input sensor 22 may alternatively include an electro-acoustic transducer (e.g., a microphone) for sensing an audio signal such as, for example, one or more words spoken by a mechanism operator. The communication device 24 may include a cellular, satellite, and/or radio transmitter and a cellular, satellite, WiFi, Bluetooth, and/or radio receiver.

The memory 26 (e.g., a non-transitory computer readable medium) may be configured to store software (e.g., program instructions) for execution by the processing device 28. The memory 26 may include a volatile memory and/or a non-volatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The processing device 28 may be implemented using hardware or a combination of hardware and software. The processing device 28 hardware may include one or more processors, analog and/or digital circuitry, etc.

The processing device 28 is connected to the display screen 18, the inertial sensor 20, the user input sensor 22, the communication device 24, and the memory 26. The processing device 28 is also in signal communication (e.g., wirelessly connected or wired) with the mechanism 12 through the communication device 24. Alternatively, various types of vibration or haptic feedback components may also be provided along with or instead of the screen 18. It is to be understood that present invention is not to be limited in any way by the electronic or mechanical elements and may include elements other than those specifically described herein as well as any known or future equivalents.

Referring to FIGS. 3 and 4, the device housing 30 may define a coordinate system 32 having an x-axis 34, a y-axis 36 and a z-axis 38. The particular axes and their relationship with the housing 30 of course can vary.

In one embodiment of the present invention, the device housing 30 extends along the x-axis 34 between a first housing end 40 and a second housing end 42. The device housing 30 extends along the y-axis 36 between a third housing end 44 and a fourth housing end 46. The device housing 30 also extends along the z-axis 38 between a first housing side 48 and a second housing side 50. The display screen 18 and/or the user input sensor 22 may be located on the first housing side 48 as illustrated in FIG. 3.

Figure 5:
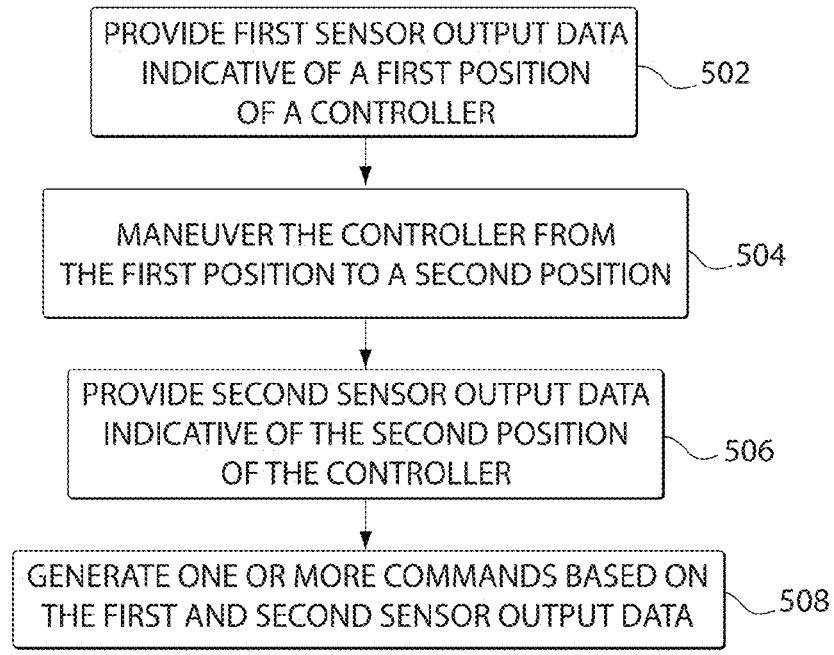
FIG. 5 is a flow diagram of a method for generating one or more commands with a handheld controller.

FIG. 5 is a flow diagram illustrating one embodiment of a method of the present invention for generating one or more commands with the controller 14. As described below in further detail, the commands may be generated to remotely control the mechanism 12 in performance of one or more tasks. Examples of a task may include moving the mechanism 12 as well as actuating a mechanism (e.g., one or more arms 16) on the mechanism 12 or any other desired function or motion of the mechanism 12.

Referring to FIGS. 1 and 3-5, in step 502, the inertial sensor 20 provides first sensor output data to the processing device 28 indicative of a first position (e.g., orientation) of the device housing 30. In step 504, the device housing 30 is maneuvered from the first position to a second position. A mechanism operator, for example, may rotate the device housing 30 about and/or translate or move the device housing 30 along the x-axis 34, the y-axis 36 and/or the z-axis 38 of the coordinate system 32. In step 506, the inertial sensor 20 provides second sensor output data to the processing device 28 indicative of the second position of the device housing 30.

In step 508, the processing device 28 generates one or more commands based on the sensor output data provided by the inertial sensor 20. The first and second sensor output data, for example, may be input into a rotation matrix that mathematically maps the positional change (e.g., rotation) of the device housing 30 between the first and second positions. The rotation matrix may be processed, for example, with an Euler angle extraction algorithm or any other type of algorithm or method to define the positional change of the device housing 30 by its axial or other components. Each axial component may correspond to a distance (e.g., number of degrees) the device housing 30 was rotated (and/or translated) between the first and second positions relative to a respective one of the coordinate system 32 axes. An x-axial component, for example, may correspond to the relative rotation of the device housing 30 about the x-axis 34. A y-axial component, for example, may correspond to the relative rotation of the device housing 30 about the y-axis 36. A z-axial component, for example, may correspond to the relative rotation or angular velocity, linear velocity or linear acceleration of the device housing 30 about the z-axis 38.

One or more of the axial components may subsequently be processed to respectively generate the one or more commands. The axial components may be processed for each time step utilizing a continuous orientation control program. Alternatively, the axial components from one or more (e.g., successive) inertial sensor 20 measurements may be processed over a series of time steps utilizing a discrete orientation control program with, for example, a time series matching algorithm, an example of which is a dynamic time wrapping (DTW) algorithm or a modified dynamic time wrapping algorithm, or any other type of algorithm or method.

One example of a modified dynamic time wrapping algorithm is a FastDTW algorithm in which (i) a time series is sampled down to a relatively low resolution, (ii) a warp path is generated for the low resolution and projected onto a relatively higher resolution time series, and (iii) the projected warp path is refined and subsequently projected onto another incrementally higher resolution time series. The refinement process described in step (iii) may be iteratively performed until, for example, a warp path with a substantially full resolution time series is generated.

Each command may be generated based on (i) the particular coordinate system 32 axis about which the device housing 30 was rotated, (ii) the distance the device housing 30 was rotated about the coordinate system 32 axis, and/or (iii) the speed or acceleration with which the device housing 30 was rotated about the coordinate system 32 axis. A command to perform a first task may be generated, for example, where the x-axial component indicates that the device housing 30 was rotated about the x-axis 34. A command to perform a second task may be generated, for example, where the y-axial component indicates that the device housing 30 was rotated a particular distance about the y-axis 36. A command to perform a third task may be generated, for example, where the z-axial component indicates that the device housing 30 was rotated at a particular speed about the z-axis 38.

In some embodiments, the command(s) may also be generated based on vertical, longitudinal and/or lateral translation of the device housing 30 along one or more of the coordinate system 32 axes or combinations thereof. Vertical translation of the device housing 30 along the y-axis 36 may be mapped by the processing device 28, for example, utilizing the discrete orientation control program described above. In this example, the y-axial component may be indicative of a vertical distance and/or a speed at which the device housing 30 was translated along the y-axis 36.

In some embodiments, the generation of the one or more commands in step 508 may be selectively controlled utilizing, for example, the user input sensor 22. The processing device 28 may be signaled to process the sensor output data and generate the one or more commands, for example, where the user input sensor 22 is activated (e.g., depressed) by the mechanism operator. In this manner, the user input sensor 22 is configured to substantially reduce or prevent generation of commands through unintentional movement of the controller 14 by the mechanism operator.

A person of skill in the art will appreciate that aforedescribed steps, which are shown in FIG. 5, may be repeated for a plurality of (e.g., successive) iterations (e.g., time steps) in order to generate the one or more commands. The inertial sensor 20 therefore may measure changes in the device housing 30 position and orientation, and provide the first sensor output data to the processing device 28, for example, continuously throughout a prolonged device housing 30 maneuver.

Figure 6:
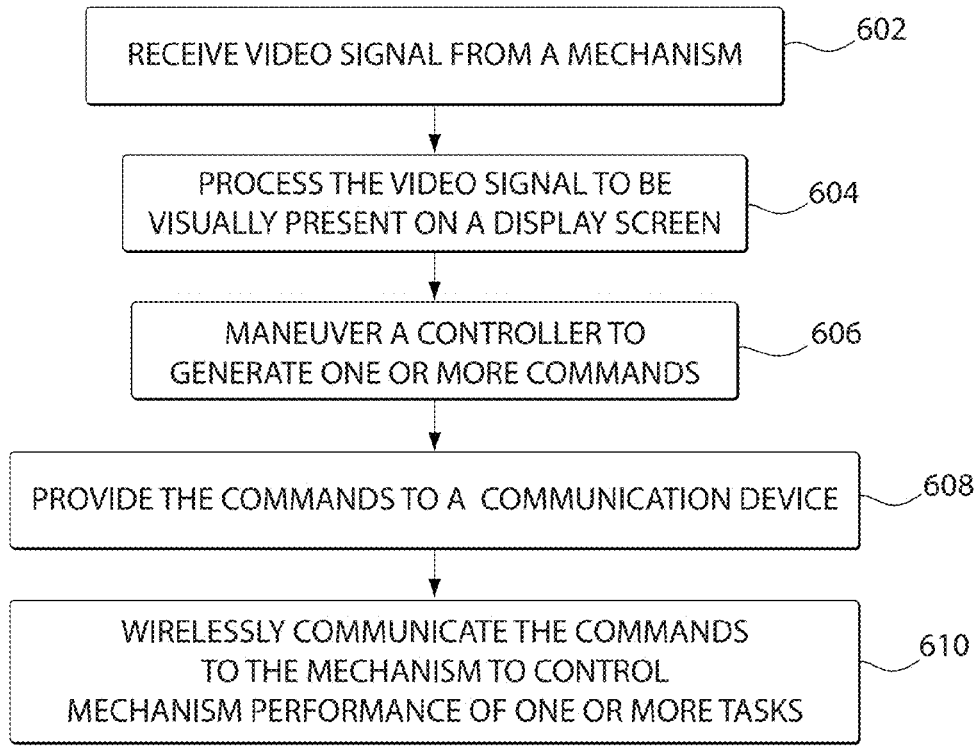
FIG. 6 is a flow diagram of a method for operating a remote controlled mechanism system.

FIG. 6 is a flow diagram of a method for operating the system 10. Referring to FIGS. 1-4 and 6, in step 602, the communication device 24 may receive a video signal generated by, for example, a camera 52 (see FIG. 2) on the mechanism 12. The video signal may be wirelessly transmitted from the mechanism 12 to the communication device 24 through, for example, a cellular, satellite, and/or other radio network. In step 604, the processing device 28 processes the video signal to be visually presented on the display screen 18. In this manner, the mechanism operator holding the controller 14 may remotely visually monitor surroundings of the mechanism 12; e.g., where the mechanism operator and the mechanism are separated by an obstruction or barricade, etc. It is to be noted that the signal may also be pre-processed and/or encoded for streaming where, for example, the mechanism or robot 12 detects a person or object prior to transmitting the signal.

In the present application, the term "command" is generally and preferably referred to some type of complex signal that frequently can be referred to as a "vector" command or signal having a plurality of components. For example, a vector command may have one component for the direction and another for the speed of the robot 12 or the like. Although the vector command can have various components, not every component needs to be providing information at any point in time. It is to be understood, however, that the vector command or signal can have any number of components and can relate to any function, mode or other characteristic of the robot 12 as desired.

Figure 7:
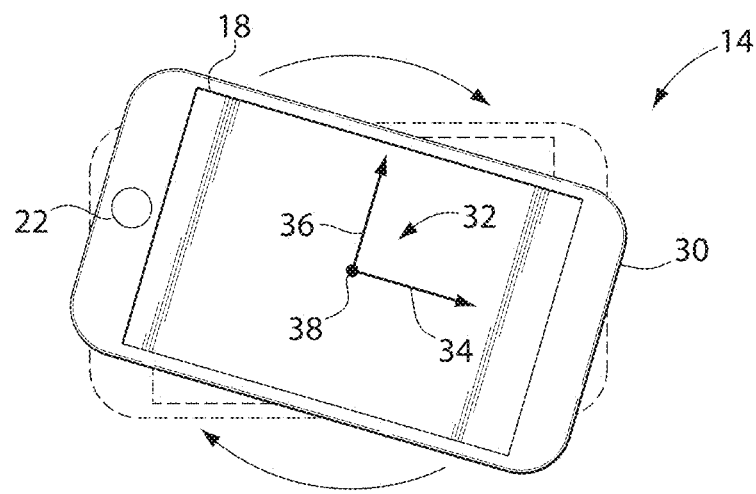
FIG. 7 is a front view illustration of a handheld controller being maneuvered about a first coordinate system axis.

In step 606, the controller 14 is maneuvered to generate one or more commands for controlling movement (e.g., direction and/or speed) of the mechanism 12. The mechanism operator, for example, may rotate (e.g., twist) the device housing 30 clockwise about the z-axis 38 (see FIG. 7) to generate a command for turning the mechanism 12 to the right, or counter clockwise about the z-axis 38 to generate a command for turning the mechanism 12 to turn left. In this manner, the mechanism operator may maneuver the controller 14 similar to a "steering wheel" in order to control the directional bearing of the mechanism 12.

Figure 8:
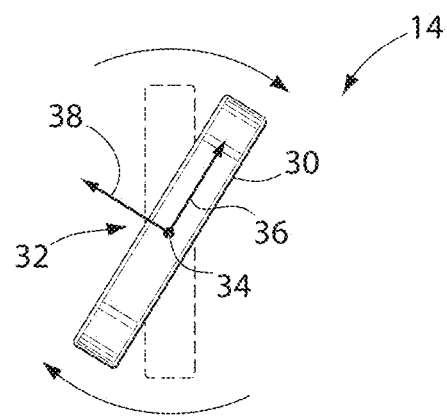
FIG. 8 is a side view illustration of a handheld controller being maneuvered about a second coordinate system axis.

The mechanism operator may also rotate (e.g., tilt) the device housing 30 clockwise about the x-axis 34 (see FIG. 8) to generate a command for increasing mechanism 12 speed, or counter clockwise about the x-axis 34 to generate a command for decreasing mechanism 12 speed. Alternatively, the mechanism operator may rotate the device housing 30 about an xz-axis 54 (see FIG. 4) to, for example, concurrently generate a first command for controlling the directional bearing of the mechanism 12 and a second command for controlling the speed of the mechanism 12. In another example, the mechanism operator may rotate the device housing 30 about the y-axis 36 to generate a command for controlling a directional elevation of the mechanism 12, for example, where the mechanism 12 is a UAV.

The command(s) may be generated by the processing device 28, as indicated above, based on the speed at which the device housing 30 is maneuvered and/or the distance the device housing 30 is maneuvered, for example, to control magnitude of a desired change in mechanism movement (e.g., speed and/or direction). The mechanism operator, for example, may rapidly rotate the device housing 30 about the x-axis 34 to cause the mechanism 12 to rapidly accelerate or decelerate (e.g., in a forward or reverse direction).

In another example, the mechanism operator may rotate the device housing 30 a relatively large distance about the z-axis 38 to cause the mechanism 12 to make a relatively tight turn. In still another example, the mechanism operator may slowly rotate the device housing 30 about one or more of the coordinate system 32 axes to generate one or more commands for fine-grained mechanism control, or rapidly rotate the device housing 30 about one or more of the coordinate system 32 axes to generate one or more commands for coarse-grained mechanism control. The finegrained mechanism control may be used, for example, for performing precision mechanism movement such as maneuvering the mechanism 12 in an enclosed environment (e.g., a hallway, room, etc.). The coarse-grained mechanism control may be used, for example, for performing quick, nonprecision mechanism movement such as maneuvering the mechanism 12 in an open environment (e.g., a street, etc.).

In step 608, the processing device 28 provides the commands to the communication device 24. In step 610, the communication device 24 communicates the commands to the mechanism 12 in order to control movement of the mechanism 12. The commands may be wirelessly transmitted from the communication device 24 to the mechanism 12 through, for example, a cellular, satellite, and/or radio network.

In some embodiments, the controller 14 may be maneuvered to generate one or more commands for controlling at least one sub-mechanism that is operably connected to the mechanism 12 such as, for example, a manipulator (e.g., the arm member 16). The mechanism operator, for example, may switch between a vehicle movement control program and a manipulator movement control program by activating, for example, a touch screen user input sensor. The mechanism operator may subsequently rotate the device housing 30, for example, clockwise about the z-axis 38 (see FIG. 7) to generate a command for moving the arm member 16 up, or counter clockwise about the z-axis 38 to generate a command for moving the arm member 16 down.

In another example, the mechanism operator may rotate the device housing 30 clockwise about the x-axis 34 (see FIG. 8) to generate a command for extending the arm member 16 away from the mechanism 12, or counter clockwise about the x-axis 34 to generate a command for retracting the arm member 16 towards the mechanism 12. Alternatively, the mechanism operator may translate the device housing 30 along, for example, the z-axis 38 to generate a command for extending or retracting the arm member 16. The mechanism operator may also activate (e.g., depress) the user input sensor 22 to, for example, generate a command for grasping an object with an (e.g., gripping) end effector connected to the arm member 16. Alternatively, the controller 14 may be maneuvered (e.g., rotated and/or translated) relative to at least one of the axes to control actuation of the end effector. In some embodiments, the controller 14 may include an additional user input sensor configured to selectively control the generation of the one or more commands and/or the communication of the commands to the mechanism 12.

In alternate embodiments, the controller 14 may be configured to wirelessly control a robotic mechanism (e.g., a manipulator, end effector or the like that preferably is flexible and/or has a high degree of freedom) that is operably connected to a non-mobile robotic system. An example of non-mobile robotic system is a computer numerical control (CNC) machine. It is to be understood, however, that the controller 14 can be utilized with any type of object, mechanism, vehicle, robot, computer, PC, electronic device, TV, tractor, lawn mower, power tool or any other device as desired.

In some embodiments, supplemental data may be wirelessly communicated to the communication device in order to load new software onto or upgrade the software of the controller, provide a new map of the surrounds, provide for some type of mode change or any other desired data. It is also contemplated that such supplemental data may be communicated to the controller through a wire line. Additionally, a variety of data may be sent back from the mechanism 12 to the controller 14 in addition to mere video or audio date including whether the mechanism 12 is connected to the controller 14, battery state, speed or any other desired information.

In some embodiments, the controller may control the mechanism via a wire line, rather than a wireless communication channel. In addition, the controller may utilize a smart phone or tablet device such as, for example, an Apple iPhone™ device, a Google Droid™ device, or a similar smart phone device that may execute an application that performs the steps of, for example, FIGS. 5 and 6.

Figure 9A:
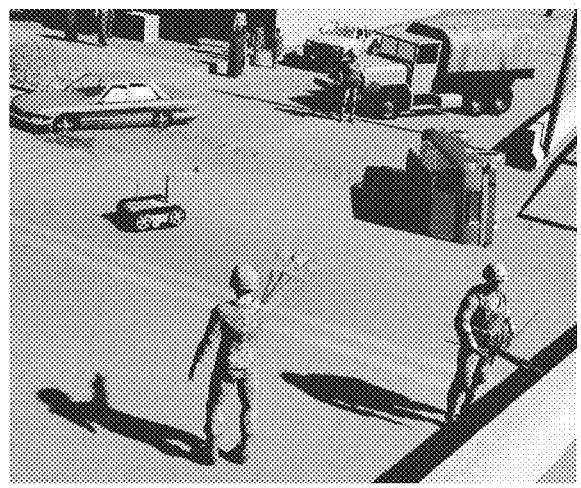
FIGS. 9a-9f illustrate various alternative embodiments of the present invention.
Figure 9B:
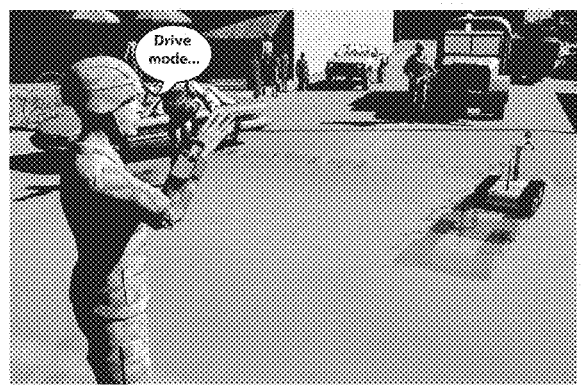
Figure 9C:
Figure 9D:
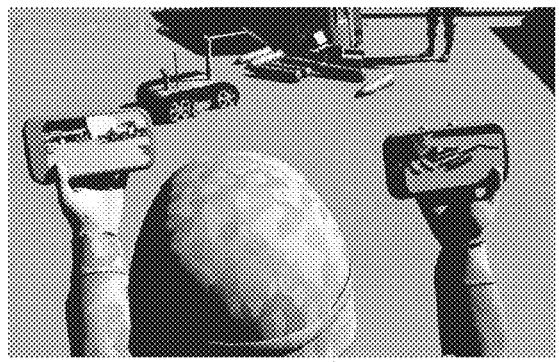
Figure 9E:
Figure 9F:

FIGS. 9a-9f illustrate some of the above-referenced features of the present invention including gesture control or command in FIG. 9a, speech control in FIG. 9b, manipulation control in FIG. 9c as well as Intelligence, Surveillance and Reconnaissance (ISR) sharing in FIG. 9d, waypoint navigation in FIG. 9e and person following in FIG. 9f.

With regard to ISR sharing in FIG. 9d, it is to be understood that any number of controllers 14 can be utilized with any number of users to assist in the manipulation of the mechanism 12 as desired. For example, two users can each have a controller 14 with different camera views or other information where one user watches the front view of the mechanism 12 while the other watches the back or side of the mechanism 12 for various information such as an unfriendly approaching the mechanism 12. This feature is quite important in military operations, for example, where several pairs of eyes can be looking at various directions to enable taking in the entire environment within which the mechanism 12 is operating.

With waypoint navigation as illustrated in FIG. 9e, a user can merely identify a waypoint to which the mechanism or robot 12 is to move to and the robot 12 is capable of proceeding from its current waypoint position to the new waypoint position. Similarly, a position on the screen of the controller 14 can be touched by a user that corresponds to a waypoint to which the user wants the robot 12 to move. This feature can be implemented in a variety of ways and eliminated the need to input specific waypoint coordinates or the like which enables much quicker and accurate movement of the robot 12. It is to be understood that a variety of alternative types of waypoint navigation are contemplated by the present invention.

Person following is another mode contemplated by the present invention as illustrated in FIG. 9f. When the robot 12 or other mechanism is in this mode the robot 12 merely follows the user as desired. This feature can be used in a variety of applications in military and civilian environments not just to have the robot 12 follow the user but the robot 12 may be configured to transport a load or the like as a user is walking across various terrain or the like.

Another feature that may be provided with the present invention is one or more forms of visual augmented reality for viewing on the screen of the controller 14. For example, to help ascertain the terrain a robot 12 or the like may be engaging contour lines can be provided indicating any differences in elevation. Various other types of indicators can also be employed to augment or assist the user in operating the controller 14 and robot 12.

Another way to assist an operation or user would be to provide some type of visual screen alert or audible alert to notify the user of a problem or the like out of view of the cameras of the robot 12, for example. This alert can be triggered by some type of sensor or, in the case of multiple users, triggered by another user or any other method.

Yet another feature of the present invention would be the inclusion of some type of haptic feedback or other type of indicator to the controller 14 should the robot 12 or the like engage with some type of obstacle such as a rock or the like. Similarly, some type of haptic feedback or indicator to the controller 14 can be provided in the event the robot 12 is hit by an external object such as a push from a person, a hit by a blunt instrument or even a bullet or the like. This can help the operator in the overall operation of the controller 14 and robot 12.

In operating a robot 12 or other mechanism, the particular terrain the robot 12 is encountering can also have an effect on performance and should be monitored by a user, particularly a user who is positioned remote from the robot 12. For example, if the terrain is muddy that would be something the user would want to know since it can affect speed and turning, among other features. Another example is if the robot 12 encounters steep terrain or a rocky surface the operator may want to switch modes or reconfigure the robot 12 to better travel on such surfaces. This is particularly true with the reconfigurable robots described in the above-referenced patents.

An additional feature of the present invention is in the ability to use "satellite driving" of a robot 12 by the controller 14. With this feature, a satellite picture of the robot 12 in its present environment is provided to the user via the controller 14. The satellite view or map indicates the position of the robot 12 as well as other buildings, vehicles and other items in the environment just as you would see from an actual overhead satellite view. A user can merely touch and/or drag and drop various positions on the screen to tell the robot 12 where to go next. The robot 12 identifies that position on the satellite view and automatically and autonomously navigates to that position.

Similarly, a user can take a picture with the controller 14 of an item that can be recognized by the robot 12. Once the picture is taken, the robot 12 can automatically and autonomously navigate to that spot identified in the picture.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims which include known equivalents and unforeseeable equivalents at the time of filing of this application.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

What is claimed is:

1. A method for controlling a mechanism in communication with a handheld device, comprising:
    sensing a maneuver of an entirety of the handheld device using electronics housed within the handheld device; and
    providing at least one vector command to the mechanism based on the sensed maneuver in order to control the mechanism;
    wherein the providing of the at least one vector command is performed without requiring touching of an interface of the handheld device during the entire maneuver;
    wherein the sensing of the maneuver includes sensing a speed and/or acceleration at which the handheld device is maneuvered; and
    wherein the providing of the at least one vector command includes selecting a speed the mechanism is to operate based on the sensed speed and/or acceleration.

2. A method for controlling a mechanism in communication with a handheld device, comprising:
    sensing a maneuver of the handheld device using electronics housed with the handheld device, wherein the handheld device comprises one of a laptop computer, a tablet computer, a personal digital assistant and a cellular telephone, and
    providing at least one vector command to the mechanism based on the sensed maneuver in order to control the mechanism, wherein the providing of the at least one vector command is performed without requiring touching of an interface of the handheld device;
    wherein the sensing of the maneuver includes sensing a speed or acceleration at which the handheld device is maneuvered; and
    wherein the providing of the at least one vector command includes selecting a speed the mechanism is to operate based on the sensed speed or acceleration.

3. The method as defined in claim 2, wherein the vector command includes at least two components, where a first of the components at least controls a speed of the mechanism.

4. The method as defined in claim 3, wherein a second of the components at least controls a direction that the mechanism moves.

5. The method as defined in claim 2, wherein a first component of the vector command at least enables the mechanism to change at least one of a speed of the mechanism and a direction that the mechanism moves, and a second component of the vector command at least controls a magnitude of the change.

6. The method as defined in claim 2, wherein the mechanism comprises a vehicle configured with a manipulator, and the vector command at least controls the manipulator.

7. The method as defined in claim 2, wherein
    the maneuver of the handheld device is sensed relative to one or more axes; and
    the maneuver comprises at least one of a rotation of the handheld device about a first of the axes, and a translation of the handheld device along the first of the axes.

8. The method as defined in claim 7, wherein the maneuver further comprises at least one of a rotation of the handheld device about a second of the axes, and a translation of the handheld device along the second of the axes.

9. The method as defined in claim 2, wherein
    the maneuver of the handheld device is sensed relative to one or more axes;
    a first component of the vector command is provided based on a direction the handheld device is maneuvered relative to a first of the axes; and
    a second component of the vector command is provided based on at least one of a speed and a distance that the handheld device is maneuvered relative to one of the axes.

* * * * *